United States Patent Office 3,298,848
Patented Jan. 17, 1967

3,298,848
AQUEOUS DISPERSION OF MODIFIED DRYING AND SEMI-DRYING OILS CONTAINING WATER-SOLUBLE DRIER
Fritz H. W. Wachholtz, Molenweg 28, Nunspeet, Netherlands, and Christiaan Korf, Caen van Necklaan 47, Rijswijk, Netherlands
No Drawing. Filed Oct. 4, 1965, Ser. No. 492,912
19 Claims. (Cl. 106—264)

This is a continuation-in-part of our copending application Serial No. 217,252, filed August 10, 1962, now abandoned.

The present invention relates to substantially colloidal or micellar dispersions of a coating vehicle in water, such as paints. The vehicle is so highly dispersed that the resultant composition may be nearly as clear as a real aqueous solution.

The vehicles contemplated herein are modified semi-drying and drying oils which contain carboxylic groups at least partially neutralized with ammonia or another nitrogen containing base, and which are capable of oxidation polymerization. The invention provides a new class of driers capable of catalyzing the drying reaction of such vehicles.

Drying and semi-drying oils, which are commonly used as coating vehicles are converted from the liquid into the solid state by oxidation. This property is used to effect the drying of paints, lacquers, printing inks and the like which, after being applied in a thin layer on a surface, dry thereon to form a solid film.

The carboxylic groups are introduced into the modified oils used as the coating vehicle in the aqueous dispersions of this invention by (a) reacting a drying or semi-drying oil, which may have been pre-modified with an $\alpha$-$\beta$-unsaturated dicarboxylic acid, or (b) by partial esterification of polycarboxylic acids, i.e. phthalic acid, with a semi-drying or drying oil containing free hydroxyl groups. Water dispersible coating vehicles of this type are well known and are described, for instance in U.S. Patents Nos. 2,999,197, 2,285,646, 2,262,923, 2,188,182/3/4/5/6/7/8 and 2,063,541.

In water based paint vehicles, the carboxyl groups of the semi-drying or drying oils are at least partially neutralized with ammonia or other nitrogen containing bases to make them water dispersible.

Driers or siccatives are generally used with such vehicles to quicken their drying, and all conventional driers are oil soluble metallic soaps. While the acid group to which the metal is bound plays no part in the drying or catalyzing action of the metal, it governs the solubility of the compound and is, therefore, important because a metal soap which does not completely dissolve cannot properly catalyze the drying of the film formed from the vehicle.

We have now found that the rule relating to the oil solubility of driers does not hold for water dispersible vehicles. The drier need not to be soluble in the oil nor need it be soluble in an organic solvent. It is sufficient that the drier be a water soluble compound. It is not necessary to precipitate the desired drier compound by double conversion with an alkali salt of the acid group to be introduced, followed by washing, drying and dissolution of this compound in an organic solvent. The aqueous solution of a metal salt may be used as a drier without further modification. Surprisingly and contrary to all expectation, no separation or crystallization takes place during the drying. Since the metal is present as a water soluble compound, it is thereby capable of completely unfolding its activity as do the oil soluble driers. This makes metal salts of inorganic acids useful and for economical reasons, these salts are preferred.

It is accordingly an object of the present invention to replace expensive oil soluble driers for coating vehicles included modified semi-drying oils and drying oils by less expensive water soluble compounds in aqueous dispersions of water dispersible vehicles of this type.

It is another object of this invention to provide such water soluble siccatives which do not crystallize during the drying of water-dispersed coating vehicle but which are fully incorporated therein so as to exert their full catalytic or modifying activity.

It is also an object of the invention to provide combinations of compounds of different metals to improve the drying effect synergistically, including the combination of different water soluble metal compounds as well as water soluble and oil soluble metal compounds, which latter combination may be preferred under certain conditions.

It is yet another object to modify the properties of dried films formed from water-dispersed coating vehicles by the choice of water soluble metal compounds whose drying effect had not been known heretofore.

It is a further object to provide a micellar aqueous dispersion of coating vehicles of the indicated type containing a solution of a metal compound of the indicated type, whose drying capacity does not substantially deteriorate during storage.

The above and other objects and advantages are obtained in accordance with the invention by using a water soluble metal compound, preferably a salt or hydroxide, as a drier in a substantially colloidal aqueous dispersion of a modified semi-drying or drying oil containing carboxyl groups at least partially neutralized with a nitrogen containing base and being capable of oxidation polymerization. The catalytic metal in the compound is a heavy metal selected from the group consisting of iron, cobalt, nickel, vanadium, chromium, manganese, copper, zirconium and molybdenum. The amount of the water soluble metal compound in the dispersion is such that the metal constitutes from 0.01% to 3% by weight of the coating vehicle. Water soluble chelate compounds wherein the catalytic metal is chelated are useful. Such compounds are described in "The Chemistry of the Metal Chelate Compounds" by Martell and Kelvin, Prentice Hall, Inc., 1952.

Also, in addition to water soluble salts, complex compounds are useful wherein the catalytic metal forms part of a complex cation or anion. Examples of catiogenic metal complexes include ammino- and tertiary amminocopper or nickel salts, such as sulfates, chlorides, bromides and the like. Tertiary ammino salts may be aliphatic, such as the complex of trimethylamine, or aromatic, for instance the complex of pyridine.

Examples of anionogenic complex compounds include the cyano-, nitroso- and nitrito cobalt- and ironsalts, with a non-critical cation which may be ammonium, potassium, sodium or lithium.

The driers of the present invention operate substantially in the same manner as the known oil soluble siccatives, i.e., because the valence of the metals changes or the metals form peroxides with the oxygen of the air. Also, as is the case with the water-insoluble siccatives, the catalytic activity of the water-soluble metal compounds may be modified by adding salts whose metals neither change their valence nor form peroxides with oxygen from the air.

One of the advantages of this invention is the provision of a considerably increased number of siccatives for water base paints. We have found strongly catalytic water soluble compounds of metals whose oil-soluble soaps stimulate oxidation polymerization of the same coating vehicle only moderately or not at all. Furthermore, we have found such water soluble salts in which the drying action is due to the anion, which has not been known in siccatives and is quite unexpected.

For instance, chromium in the form of potassium, sodium, lithium or ammonium chromate or bi-chromate, iron in the form $K_3Fe(CN)_6$ or $K_4Fe(CN)_6$, and cobalt in the form of $Na_3(Co(NO_2)_6)$ are examples of these materials. These salts contain the active metal in the anion, which is contrary to all siccatives previously known. Their activity in this form could not be predicted.

Vanadium acts similar to chromium when in the form of a vanadate dissolved in water. Ammonium vanadate also has the active metal bound in the anion. Since ammonium vanadate is not very water soluble it is preferably used in combination with ammonium chromate in the molecular ratio of 1 to 1. The combination is considerably better soluble and may be more active than the individual components.

In addition to ammonium chromate and ammonium vanadate, ammonium molybdate is also a siccative for water dilutable vehicles. The salt $(NH_4)_6Mo_7O_{24} \cdot 4H_2O$ appears to be especially active at elevated temperature (130° C.).

Furthermore, certain water soluble salts which do not have a truly siccative effect are useful in combination with the driers of this invention because they influence the drying of the vehicle when in the presence of the water soluble driers. Thus, such metals as zinc and cerium, do not catalyze the oxidation polymerization of the coating vehicles but they have been found to modify the siccative action of the driers. Therefore, water soluble salts such as zinc sulfate or acetate, which modify the siccative action of oxygen transferring metals, may be used in combination with the water soluble driers as well as with oil soluble driers.

Among the water soluble metal compounds found useful as driers in the aqueous coating vehicle emulsions of this invention cobalt salts derived from sulfuric acid, hydrochloric acid, nitric acid, acetic acid, formic acid and the like show substantially the same activity as oil soluble type cobalt driers. Just as an oil-containing vehicle with 0.07% cobalt added as cobalt naphthenate leads to the desired drying, about 0.07% of cobalt in the form of cobalt chloride, cobalt acetate, and the like added to the water dispersed vehicle leads to the desired result.

The simple cobalt and/or manganese salts such as cobalt or manganese acetate may give rise to turbidity, when they are used in dilute aqueous solutions of the coating vehicle. This difficulty does not arise with many other water soluble metal compounds of the general types hereinabove described such as the following: copper compounds, including copper hydroxide, copper acetate and copper sulfate may be used as siccatives with good results while copper naphthenate and other oil soluble copper soaps show practically no drying activity. Since the water dispersed vehicle contains ammonia or derivatives thereof, it is recommended that a copper ammonium complex be formed by adding ammonia to the solution of the copper salt until the initial precipitate is dissolved. This is in the range of 6 moles $NH_3$ to 1 mole of the copper salt. In this manner, the possibility of the copper salt forming a precipitate with the carboxylic groups of the vehicle is prevented.

The tendency to form a precipitate can be reduced still further by mixing the ammonia copper salt solution with such an amount of a solution of ammonium borate that there are present one to three or even more B atoms per Cu atom. The boric acid is then also active as a siccative, the intermediary formation of peroxide compounds presumably playing a part.

As a result of the capacity of copper to form nitrogen complexes, the water soluble copper salts are very useful as driers, since the complex copper ion readily changes valence.

The same applies to nickel. This metal also readily forms nitrogen complexes and the nickel nitrogen complexes are effective siccatives which are readily taken up by the aqueous dispersion of the vehicle.

Again, the tendency to form a precipitate is further diminished by adding ammonium borate, so that, just as with copper, a nickel salt solution containing ammonium borate may be added to a very diluted aqueous dispersion of the vehicle without a precipitate being formed. The siccative activity of the nickel salt is improved by the borate.

To prevent temporary turbidity, a less concentrated salt solution may also be used, or the ion concentration may be reduced in another way. Thus, if ferric citrate is used instead of ferric chloride, which gives rise to turbidity, no turbidity appears during the mixing. The turbidity which results from ferric chloride in water can also be avoided if ammonium citrate is added to this solution in molecular ratio of 1 to 1.

The catalytic activity of iron salts dissolved in water is good both when drying takes place at elevated temperatures and at room temperature.

Sodium nitroprusside, $Na_2(Fe(CN)_5NO)$ is a siccative salt which is especially useful for baking, even though the concentration of the ferric ion in the aqueous solution containing this salt is almost zero. It is surprising that the film remains bright even at 3% level of sodium nitroprusside, calculated on the non-volatile vehicle.

As is true with previously known driers, the amount of water soluble metallic salts to be used depends upon the nature of the dispersed vehicle and the manner of application. A fast drying vehicle may require less drier than a slower drying vehicle, and when the vehicles are baked at elevated temperatures, less drier is usually required than for room temperature cure. Since the metal content of the water soluble salts is usually much higher than the metal content of the naphthenates, much less drier by weight is usually required. However, the total metal content need not necessarily be different. It is generally well known in the art what is the proper level of drier to use. As noted, this is dependent on the intended use, the type of vehicle, the drier or combination of driers used and the drying time required. Generally about 0.01% to about 3.0% calculated as metal is used, based on the amount of non-volatile vehicle.

The use of water soluble chromates works best when the water dispersed vehicle contains conjugated double bonds capable of oxidation polymerization. Vehicles based on tung oil and oiticica oil are typical examples. The usually good drying characteristic of the chromate compound with these particular vehicles is illustrated by the following composition:

An aqueous solution of tung oil (50% non-volatile) was used as the drying vehicle. The oil was rendered water soluble by the addition of 15% maleic anhydride and followed by neutralization with ammonia. The percentages of drier are calculated on the oil.

|  | Dust-dry | Non-tacky |
| --- | --- | --- |
| Co-naphthenate (0.05% Co) | 1 hour 30' | About 35 hours.* |
| Mn-naphthenate (0.05% Mn) | 1 hour 30' | About 35 hours.* |
| Mn-acetate (0.05% Mn) | 1 hour | About 30 hours.* |
| Ammonium chromate (1.5%) | 1 hour 15' | 2 hours 40'. |
| Ammonium chromate (0.5%) | 1 hour 15' | 2 hours 40'. |
| Ammonium chromate (0.25%) | 1 hour 45' | 3 hours. |

*The dried layer (40 microns) was dulled by the formation of fine wrinkles.

No turbidities appeared.

When the drying effect is compared with that of cobalt and manganese compounds, the water soluble ammonium chromate shows exceptionally good results. Furthermore, the chromate prevents the undesirable wrinkle formation which is typical of oils having conjugated double bonds.

The surprising action of the chromate compound appears also in tests with oiticica oil which has been made water soluble. Oiticica oil and tung oil both contain many conjugated double bonds. Ammonium, sodium, potassium, chromate, and bichromate were substantially equal in activity. No wrinkling of the films was observed when any of the aforementioned compounds were used.

The vehicles treated with the driers of this invention can be applied directly onto metal.

The invention is further illustrated and exemplified by the following non-limiting examples.

*Example I*

A water dispersible linseed oil type epoxy ester was used as the non-volatile coating vehicle. This vehicle was obtained by esterifying linseed fatty acids with an epoxy resin prepared by reacting bis-2,2-(p,p'-dihydroxy-phenyl) propane with epichlorohydrine followed by modifying the ester obtained by reacting it with maleic anhydride and dissolving the reaction product in ammonia water. 0.1% of the cobalt compound shown below, calculated as metal on the amount of non-volatile vehicle, was used in this test. The oil containing the various cobalt compounds was applied to a glass plate so as to form a film with a thickness of 40 microns after drying. Listed below are the cobalt compounds used and the results obtained.

| | Dust-dry | Non-tacky |
|---|---|---|
| Cobalt chloride, aqueous solution | 3 hours 30' | 7 hours 45'. |
| Cobalt acetate, aqueous solution | 3 hours 30' | 7 hours 45'. |
| Cobalt sulfate, aqueous solution | 3 hours 50' | 7 hours 20'. |
| Cobalt naphthenate, in mineral spirit (for comparison). | 3 hours | 8 hours. |

No turbidities appeared during the addition of the cobalt compounds. As shown from the table, the influence of the anion present in the salt is very slight.

Two tests were then carried out using 0.08% cobalt sulfate, calculated on the dry weight of the vehicle. This test was run with and without the addition of ammonia. The coatings were applied on acid pickled cold rolled steel panels.

| | Dust-dry | Non-tacky |
|---|---|---|
| Cobalt sulfate | 3 hours 30' | <24 hours. |
| Cobalt sulfate+8 mols $NH_3$ | 3 hours 30' | <24 hours. |

No influence was observed in the ammonia addition.

*Example II*

Manganese was used with the same vehicle as in Example I in the amount of 0.1% in both the naphthenate and sulfate form, to compare their siccative effect.

| | Dust-dry | Non-tacky |
|---|---|---|
| Manganese naphthenate in white spirits. | 6 hours 45' | <24 hours. |
| Manganese sulfate in water | 6 hours 45' | <24 hours. |

For comparison, a combination of cobalt (0.05%) and manganese (0.05%) in the form of the naphthenate, formed a dust-dry film in 6 hours 20 minutes and was not non-tacky in 24 hours.

*Example III*

Dry tests were run using the same vehicles as in Example I dissolved in ammonia. Cobalt and manganese were added in amounts of 0.1% calculated as metal on the non-volatile vehicle, and copper and nickel in amounts of 1.2%.

| | Dust-dry | Non-tacky |
|---|---|---|
| Co acetate | 3 hours 30' | 7 hours 45'. |
| Co sulfate | 3 hours 50' | 7 hours 20'. |
| Mn sulfate | 6 hours 45' | <24 hours. |
| Cu sulfate+5 mols $NH_3$ | 1 hour 20' | 6 hours 45'. |
| Ni sulfate+8 mols $NH_3$ | 1 hour 10' | 7 hours. |

The table shows the favorable drying times of Cu and Ni. The chosen amount of these metals was rather high, but if the content of Co and Mn would be increased correspondingly, the drying would not become better but considerably worse. The amount of 0.1% Co or Mn is about optimum.

A primer prepared from an epoxy ester of linseed oil fatty acids with red iron oxide and blanc fixe as the pigment and copper sulfate as the drier, dried non-tacky in two hours when applied in a film with a thickness of 40 microns after drying.

The following tests were run with this vehicle, without pigments.

Three plates of cold rolled steel of 8 by 20 centimeters were pickled with sulfuric acid and cleaned well. The plates were coated with the water dispersed vehicle which was 50%-non volatile. Three runs were made, one using 1.2% copper sulfate, another 1.2% nickel sulfate and the other without drier. About 16 hours after the application of the films, the plates were baked for 45 minutes at 130° C. Two parallel scratches were then made on the coated surface so that the iron was bared. The plates were protected on the back by a corrosion resistant paint. The plates were then submerged in water and the behavior of the clear films was observed.

The scratches began to rust after about ten days on the film without drier, after about 17 days on the clear film containing copper sulfate and after about 20 days with the clear film containing nickel sulfate. After 35 days the water around the film without driers was colored brown with rust. Around the other two panels the water was clear. All three clear films were still intact. The coating compositions containing the driers of this invention, therefore, have some rust preventitive properties. Furthermore, it appeared that these coatings have mold preventative and fungicidal properties, because algae and shell fish, when deposited upon these films, die shortly thereafter. If desired, one can further increase these properties by the addition of conventional mold preventitives.

*Example IV*

If zinc sulfate, dissolved in water and ammonia in the molecular ratio of at least 10 to 1 ammonia to zinc sulfate, is added to a vehicle so as to contain 1.2% metal based on the non-volatile vehicle, a film may be formed which is harder than films formed without zinc sulfate. However, these films dry non-tacky only after 24 hours. If 0.5% cobalt in the form of cobalt acetate is added, the films are dust dry after only 3 hours.

Since zinc is not capable of changing valence or of forming peroxides with oxygen from the air, it does not act as a catalyst even in the form of zinc naphthenate or other oil soluble zinc salts. In practice, the zinc salts are used merely to modify the drying activity of oxidation catalysts, such as cobalt or manganese naphthenate. This secondary activity is particularly clear with the water soluble salts. Cerium salts may be used for the same purpose. The water soluble salts have still another advantage compared with the oil soluble metal compounds. If one adds 1.2% of zinc to a vehicle in the form of an oil soluble salt such as zinc naphthenate, about 19% of an undesirable organic non-drying substance which is not taken up in the film and softens the paint layer is also added. When using zinc sulfate, 1.2% of zinc corresponds to only 2.5% of undesirable additives. This amount does not effect the molecular increase caused by oxidation polymerization. Zinc sulfate contains 40% zinc, while zinc naphthenate contains no more than 6% zinc. With the aid of the water soluble metal compounds, it is possible to prevent the formation of undesirable by-products of the salt. This is shown by the following test.

Zinc hydroxide, $Zn(OH)_2$, was precipitated from a solution of zinc acetate by means of a sodium hydroxide solution. The precipitate was filtered, washed and dissolved in concentrated ammonia, so that a solution was obtained which contained 2% zinc. 10 to 11 ammonia molecules per zinc atom were present.

To a vehicle similar to that described in Example I, but made water soluble with triethyl amine instead of ammonia, 0.8% zinc in the form of zinc hydroxide based on the 50% non-volatile vehicle was added. The following drying times of a 40 micron film formed with this vehicle were noted.

|  | Dust-dry | Non-tacky |
|---|---|---|
| 0.8% of Zn (as $Zn(OH)_2$+10 $NH_3$) | <24 hours | 1-3 days. |
| 0.05% of Co (as naphthenate) | 2 hours | 4 hours. |
| 0.8% of Zn+0.05% of Co (as naphthenate) | 2 hours | 3 hours. |

While zinc does not improve the drying time, the dried films containing zinc atoms were harder than the films using cobalt drier alone. Also it was noted that, when the films were baked for 45 minutes of 130° C., the film containing zinc and cobalt was the hardest.

Instead of cobalt naphthenate, the water soluble cobalt salt such as cobalt sulfate can be used. This substitution does not change the drying characteristics, as tests have proven. This is in complete agreement with the fact that the driers are compatible in the film independent of their solubility in water or in oil.

*Example V*

Besides the test using zinc hydroxide, a test was made using copper hydroxide, but without the addition of cobalt, because the copper ammino complex, contrary to the zinc ammino complex, is capable of changing valence.

An addition product of linseed oil and maleic anhydride dispersible in water was prepared as follows: 15% maleic anhydride was added to linseed oil at a temperature of 250° C. After cooling to about 60° C., 30 parts by weight of ethylene glycol monobutyl ether, 9.2 grams of 20% aqueous ammonia solution (½ the amount of ammonia necessary to neutralize all the carboxylic groups) and 61 grams of water were added to 100 parts by weight of this oil. The resulting aqueous vehicle contained 50% non-volatile.

An aqueous siccative solution was separately prepared by saturating 2 grams of copper hydroxide with 40 grams of 25% ammonia. Thereafter 10 grams of monoethyl amine were added. After setting overnight, the major proportion of the copper hydroxide was dissolved. The dark blue solution contained about 2% copper.

This solution was added to the maleic modified linseed oil so as to give 0.25% copper, based on the non-volatile vehicle. A 75 micron film made from this vehicle became dust dry after 2 hours and non-tacky after 10 hours. The thickness of the dried films was about 40 microns. Without drier, the film was not dust-dried after 10 hours.

When the vehicle of Example I was used with this copper compound and applied in the same manner as stated, the films were dust dry after two hours and 45 minutes and non-tacky after 9 hours.

*Example VI*

Zirconium is a metal which does not change valence under normal conditions but readily forms peroxide compounds with oxygen of the air. Two moles of amino acetic acid was added to a solution of 1 mole zirconyl chloride ($ZrOCl_2$) in water and the pH was adjusted to 8 with ammonia. The addition of amino acetic acid served to prevent turbidity when added to the drying vehicle. 0.2% of zirconium, calculated as metal on the non-volatile vehicle, was added.

Films without drier were dust-dry in 6 hours while films with zirconyl chloride were dust-dry in 2 hours 20 minutes.

The improvement in the dust-drying time is surprising since zirconium compounds are usually considered as auxiliary driers and are never used alone for air drying. The drying to a non-tacky state, therefore, was not satisfactory. However, when cured at an elevated temperature for 1 hour at 130° C., the film was non-tacky after cooling. The film without driers did not dry. This corresponds with the oil soluble zirconium compounds, which are good catalysts for curing baked films.

*Example VII*

The epoxy resin of Example I was dissolved in water. Ammonium chromate and ammonium chromate plus ammonium vanadate were used as the driers. The concentrations were based on the weight of the non-volatile vehicle.

|  | Dust-dry | Non-tacky |
|---|---|---|
| Ammonium chromate 3% | 3 hours 15' | 8 hours. |
| Ammonium chromate 1.5%+ammonium vanadate 1.5%. | 3 hours 15' | 8 hours. |
| Ammonium bichromate 3% | 3 hours 25' | 9 hours. |
| Sodium chromate | 4 hours | 10 hours. |
| Lithium bichromate | 3 hours 40' | 9 hours. |

Ammonium vanadate was not applied separately because it is only slightly water soluble and forms a precipitate with the drying vehicle when added in the absence of ammonium chromate.

*Example VIII*

Tests with an aqueous borax solution, to which 1 mole $H_2O_2$ per boron atom was added, showed definite drier activity. This was insufficient for practical purposes but the addition of a typical oxygen transferring compound, such as manganese in the form of manganese acetate, improved the drier activity. In the following test, the borax was replaced by a 5% boric acid solution which contained sufficient ammonia to give a pH of 8.

To the vehicle solution of Example I, 0.05% by weight of manganese in the form of a manganese acetate solution and enough ammonia-boric acid solution to give 0.5% boric acid, based on the non-volatile vehicle, were added. A sample containing only manganese acetate and a sample in which the boric acid was replaced by the same weight of $(NH_4)_2CrO_4$ were used as comparisons.

|  | Dust-dry | Non-tacky |
|---|---|---|
| Manganese acetate | 5 hours | 20 hours. |
| Manganese acetate $NH_3$+$B(OH)_3$ | 2 hours 30' | <18 hours. |
| Manganese acetate+$(NH_4)_2CrO_4$ | 3 hours | <18 hours. |

The performance of the ammonium borate is striking. It is even more surprising because ammonium borate only does not possess any drier activity.

The vehicle containing the ammonium borate, manganese acetate catalyst was also tested for water resistance in the manner described in Example III. The rust formation in the scratches did not begin until after about 20 days had elapsed. After 35 days, the film was still intact and the water clear. The water soluble drier seemed to help protect the metallic base layer.

*Example IX*

Lead is a metal which is only slightly soluble in water dispersed oils. A turbidity which could even be classed as a precipitate is produced, making the use of the lead salt impossible. Therefore, tests were performed with the vehicle of Example I, controlling the activity of lead naphthenate by the addition of ammonium borate.

|  | Dust-dry | Non-tacky |
|---|---|---|
| (a) Co-acetate (0.05% Co) | 5 hours | >8 hours, <25 hours. |
| (b) Co-acetate (0.05% Co)+Pb-naphthenate (0.5% Pb) | 5 hours | >8 hours, <25 hours. |
| (c) as (b) but with $NH_4$-borate (0.5% B(OH)$_3$) | 3 hours | 6 hours. |

The above table dramatically shows the favorable action of boric acid. This is even more surprising because in test (c) the vehicle solution was very turbid because of the presence of the lead naphthenate.

Since turbidity is undesirable, test (c) was repeated. To the same vehicle aqueous solutions of cobalt acetates, ammonium borate and lead acetate were added successively in such amounts that, based on the non-volatile vehicle, 0.05% Co, 0.5% B(OH)$_3$ and 0.5% Pb were present. By using the lead acetate dissolved in water instead of the lead naphthenate dissolved in ethylene glycol monobutyl ether, the vehicle solutions remained completely clear, so that the lead could completely develop its activity.

*Example X*

The drying of a linseed oil modified by maleic anhydride and about 40% of vinyl toluene was very strongly promoted by ammonium chromate, either with or without ammonium vanadate. The drying was also promoted by iron in the form of $FeCl_3$ (0.3% Fe) plus 1 mole ammonium citrate.

|  | Dust-dry | Non-tacky |
|---|---|---|
| Ammonium chromate+ammonium vanadate, together 1.5% | 2 hours | 3 hours 15'. |
| $FeCl_3$+mole ammonium citrate | 2 hours 45' | 4 hours 50'. |

*Example XI*

Instead of zinc, which in practice serves to modify the drying activity of cobalt and manganese, cerium can be used. To the vehicle used in Example X, a warm aqueous solution of cerium carbonate was added. The cerium was dissolved by the addition of 2 moles of ammonium citrate per mole of $Ce_2(CO_3)_3$. Sufficient cobalt acetate was also added to give 0.05% by weight of cobalt and 0.7% by weight of cerium.

|  | Dust-dry | Non-tacky |
|---|---|---|
| Co-acetate | 1 hour 30' | 6 hours. |
| Co-acetate+Ce carbonate | 2 hours 10' | 6 hours. |

In noting the drying time tabulated in the above table, it appears that the solution of cerium carbonate and ammonium citrate does not perform favourably, but after 8 hours, the cerium containing film was thoroughly dried whereas the film without cerium was still soft. The cerium strongly promotes thorough drying.

*Example XII*

The following results were obtained by baking films using the modified linseed oil of Example X. The films were baked for 45 minutes at 130° C.

| | Drying |
|---|---|
| Cobalt naphthenate (0.08%) Co | good |
| Manganese sulfate (0.08% Mn) | good |
| FeCl+1 mole ammonium citrate (0.3% Fe) | good |
| Ammonium chromate+ammonium vanadate (1.5%) | good |
| Sodium nitroprusside 2% | good |
| Cobalt sulfate (0.08% Co) | good |
| Cobalt sulfate (0.08% Co)+3 moles triethanol amine | rather good |
| Ammonium molybdate $(NH_4)_6Mo_7O_{24} \cdot 4H_2O$ (1.5%) | rather good |

Copper sulfate, nickel sulfate, ammonium chromate (1.5% salt), potassium ferric cyanide (1.5% salt) were moderately active.

The qualification "good" means that the film after baking was hard so that, when scratched with a knife, the edges of the scratched furrow were slightly milled. "Rather good" means that no milling occurred.

*Example XIII*

An aqueous dispersion of an isophthalic resin was prepared according to Dutch Patent No. 98,303 to contain 2-butoxylthanol as a lyotropic substance. Several cobalt compounds were added as siccatives.

|  | Dust-dry | Non-tacky |
|---|---|---|
| Cobalt naphthenate (0.08%) Co | 1 hour 10' | 2 hours 15'. |
| Cobalt sulfate (0.08% Co)+2 moles ammonium tartrate | 1 hour 30' | 3 hours. |
| Sodium cobalt nitrite (0.08% Co) | 0 hour 45' | <24 hours. |
| Ammonium vandate (0.5%) | 3 hours 6' | 6 hours. |

The vanadate gave no turbidity. When the vehicle was baked with the various driers for 45 minutes at 130° C., all of the resulting films were clear, hard and well dried.

What is claimed is:

1. An aqueous dispersion of
   (a) a water dispersible, organic coating vehicle selected from the group consisting of modified drying and semi-drying oils containing carboxyl groups at least partially neutralized with a nitrogen containing base, the vehicle being highly dispersed in water and capable of oxidation polymerization, and
   (b) a water soluble drier, said drier consisting of a compound of a heavy metal selected from the group consisting of iron, cobalt, nickel, vanadium, chromium, manganese, copper, zirconium and molybdenum,
   (c) the amount of the water soluble metal compound in the dispersion being such that the metal constitutes from 0.01% to 3% by weight of the coating vehicle.

2. The aqueous dispersion of claim 1, wherein the metal compound is an ammino copper complex selected from the group consisting of copper salts and copper hydroxide with ammonia.

3. The aqueous dispersion of claim 1, wherein the metal compound is an ammino nickel complex selected from the group consisting of nickel salts and nickel hydroxide with ammonia.

4. The aqueous dispersion of claim 1, wherein the metal compound is an ammino cobalt complex.

5. The aqueous dispersion of claim 1, wherein the metal is part of a complex cation in an ammino or tertiary ammino compound.

6. The aqueous dispersion of claim 1, further comprising ammonium borate containing trivalent boron, said borate being present in an amount sufficient to provide more than one boron atom per atom of the metal in said compound.

7. The aqueous dispersion of claim 1, further comprising a water soluble inorganic compound of a metal selected from the group consisting of zinc and cerium salts, hydroxide and complexes.

8. The aqueous dispersion of claim 1, further comprising an oil soluble siccative.

9. An aqueous dispersion of
   (a) a water dispersible, organic coating vericle selected from the group consisting of modified drying and semi-drying oils containing carboxyl groups at least partially neutralized with a nitrogen containing base, the vehicle being highly dispersed in water and capable of oxidation polymerization, and
   (b) a water soluble heavy metal salt drier selected from the group consisting of ammonium chromate, ammonium vanadate, a mixture of the chromate and vanadate, and ammonium molybdate,
(c) the amount of the water soluble heavy metal salt drier in the dispersion being such that the metal constitutes from 0.01% to 3% by weight of the coating vehicle.

10. An aqueous dispersion of
(a) a water dispersible, organic coating vehicle selected from the group consisting of modified drying and semi-drying oils containing carboxyl groups at least partially neutralized with a nitrogen containing base, the vehicle being highly dispersed in water and capable of oxidation, polymerization, and
(b) a water soluble potassium cyano iron salt drier selected from the group consisting of $K_4Fe(CN)_6$ and $K_3Fe(CN)_6$,
(c) the amount of the water soluble potassium cyano iron salt drier in the dispersion being such that the metal constitutes from 0.01% to 3% by weight of the coating vehicle.

11. An aqueous dispersion of
(a) a water dispersible, organic coating vehicle selected from the group consisting of modified drying and semi-drying oils containing carboxyl groups at least partially neutralized with a nitrogen containing base, the vehicle being highly dispersed in water and capable of oxidation polymerization, and
(b) sodium nitroprusside, $NaFe(CN)_5NO$, as a water soluble drier,
(c) the amount of the water soluble drier in the dispersion being such that the metal constitutes from 0.01% to 3% by weight of the coating vehicle.

12. The aqueous dispersion of claim 1, wherein the compound is an inorganic complex and the metal is part of the anion of the complex.

13. The aqueous dispersion of claim 1, wherein the compound is selected from the group of salts and hydroxide.

14. The aqueous dispersion of claim 2, wherein the complex is ammino copper sulfate.

15. The aqueous dispersion of claim 3, wherein the complex is ammino nickel sulfate.

16. The aqueous dispersion of claim 4, wherein the complex is ammino cobalt sulfate.

17. The aqueous dispersion of claim 8, wherein the siccative is a naphthenate of a metal selected from the group consisting of cobalt and lead.

18. The aqueous dispersion of claim 1, wherein the compound is selected from the group consisting of sulfates, acetates and hydroxide.

19. The aqueous dispersion of claim 1, wherein the compound is selected from the group consisting of ammino sulfates, acetates and hydroxide.

References Cited by the Examiner
UNITED STATES PATENTS

| | | |
|---|---|---|
| 3,036,934 | 5/1962 | Horton et al. |
| 3,053,785 | 9/1962 | Rosenbloom ___ 260—29.6 XR |
| 3,053,787 | 9/1962 | Suen et al. _____ 260—29.6 |
| 3,077,459 | 2/1963 | Hershey et al. ___ 260—29.2 XR |
| 3,154,507 | 10/1964 | Krammer et al. _____ 260—22 |
| 3,196,118 | 7/1965 | Peters _____ 260—22 |

ALEXANDER H. BRODMERKEL, *Primary Examiner.*

J. B. EVANS, *Assistant Examiner.*